US008800043B2

(12) United States Patent
Khachaturov

(10) Patent No.: US 8,800,043 B2
(45) Date of Patent: Aug. 5, 2014

(54) PRE-EMPTIVE PRE-INDEXING OF SENSITIVE AND VULNERABLE ASSETS

(75) Inventor: Vassilii Khachaturov, Lehavim (IL)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 12/122,734

(22) Filed: May 19, 2008

(65) Prior Publication Data

US 2009/0288141 A1 Nov. 19, 2009

(51) Int. Cl.
*G06F 21/00* (2013.01)

(52) U.S. Cl.
USPC ...... 726/25; 726/3; 726/22; 726/23; 707/741; 707/707; 705/51

(58) Field of Classification Search
USPC .......... 726/3, 4, 7, 13, 16, 22–25; 705/39, 51; 707/5, 707, 741
See application file for complete search history.

(56) References Cited

U.S. PATENT DOCUMENTS

| 6,589,290 | B1 | 7/2003 | Maxwell et al. | |
|---|---|---|---|---|
| 6,880,087 | B1 | 4/2005 | Carter | |
| 7,152,244 | B2 | 12/2006 | Toomey | |
| 8,108,370 | B1* | 1/2012 | Bruening | 707/697 |
| 2004/0260680 | A1* | 12/2004 | Best et al. | 707/3 |
| 2005/0005145 | A1 | 1/2005 | Teixeira | |
| 2005/0086252 | A1 | 4/2005 | Jones et al. | |
| 2005/0192902 | A1* | 9/2005 | Williams | 705/51 |
| 2005/0229254 | A1 | 10/2005 | Singh et al. | |
| 2006/0048224 | A1* | 3/2006 | Duncan et al. | 726/22 |
| 2006/0224589 | A1 | 10/2006 | Rowney et al. | |
| 2007/0050777 | A1 | 3/2007 | Hutchinson et al. | |
| 2007/0192863 | A1 | 8/2007 | Kapoor et al. | |
| 2007/0261099 | A1* | 11/2007 | Broussard et al. | 726/1 |
| 2008/0098476 | A1* | 4/2008 | Syversen | 726/23 |
| 2008/0109881 | A1* | 5/2008 | Dasdan | 726/4 |
| 2008/0209567 | A1* | 8/2008 | Lockhart et al. | 726/25 |
| 2008/0243828 | A1* | 10/2008 | Reztlaff et al. | 707/5 |
| 2009/0119769 | A1* | 5/2009 | Ross et al. | 726/13 |
| 2009/0328206 | A1* | 12/2009 | Bardsley et al. | 726/22 |

OTHER PUBLICATIONS

Almgren, et al, "A Lightweight Tool for Detecting Web Server Attacks", In: Proceedings of the ISOC Symposium on Network and Distributed Systems Security, San Diego, CA, Feb. 2000, pp. 1-14.
Benedikt, et al., "VeriWeb: Automatically Testing Dynamic Web Sites", In 11th International World Wide Web Conference. ACM Press, 2002, pp. 1-15.
Zhao, et at., "WSF: An HTTP-level Firewall for Hardening Web Servers", From Proceedings on Parallel and Distributed Computing Systems, Dated: 2005, pp. 248-253.

* cited by examiner

*Primary Examiner* — Venkat Perungavoor
*Assistant Examiner* — Amir Mehrmanesh
(74) *Attorney, Agent, or Firm* — Ben Tabor; Kate Drakos; Micky Minhas

(57) ABSTRACT

A system and method for identifying sensitive content or indications of vulnerabilities is provided. A local search engine may index content at a data center. Specifications of sensitive data or fingerprints of vulnerabilities may be received from various internal or external sources. Targeted data may include vulnerable software, confidential content, dynamic or static web pages, or application data. Based on searches for targeted data, one or more components may be notified, enabling one or more security actions, including restricting publication of the targeted data.

19 Claims, 4 Drawing Sheets

PRE-EMPTIVE PRE-INDEXING OF SENSITIVE AND VULNERABLE ASSETS

TECHNICAL FIELD

The present invention relates generally to computer systems, and, more particularly, to pre-indexing of content in a network.

BACKGROUND

Within a network perimeter, there is often content that may be provided or otherwise exposed to entities outside of the perimeter. For a variety of reasons, there may be a subset of the content that is not desired to be externally exposed, or at least not exposed without a certain level of authorization. The subset of content may include confidential data, such as individual social security numbers or other personal identification, account information, confidential documents, or the like. The subset of content may also include content that reveals vulnerabilities of the data center.

Search engines may be used to search for and retrieve content. A web crawler retrieves pages or other content from a web site, indexes the data, and makes the data or pointers to the data available to a search engine. An external adverse party may, for example, search for keywords or phrases, such as "social security number," retrieve numerous pages, and find actual social security numbers on some of the pages. Searching may be performed broadly, in the hope of discovering sensitive information or vulnerabilities somewhere, or it may be focused. A focused search may look in a specific web site, for a specific name, or for a known keyword associated with sensitive data. For example, an adverse party may search for a code name for a confidential project at a company, hoping to find a document that is intended to remain internal, but was inadvertently exposed outside of the company's perimeter.

An adverse party may search for data centers that contain vulnerabilities, or for vulnerabilities within a data center. One way this can be done is by searching for content that is indicative of a specific instance of or a type of vulnerability. For example, if a specific version of a software application or operating system is known to have vulnerabilities, an adverse party may search for documents produced with the specific version. Existence of such documents may suggest that the software version is in use at the data center. Characteristics of the documents that may indicate a corresponding software component are referred to as "fingerprints" of the component or vulnerability.

Sensitive data may have been deleted or restricted by the web site after it has been crawled, but may remain in the search engine's cache of content and provided to searchers. Web archive servers may crawl web sites, retrieve sensitive content, and archive the data for retrieval years after the data was removed from the web site.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to identify sensitive and vulnerable assets at a data center. This may include sensitive content and vulnerable software. The system may facilitate restricting sensitive content or fingerprints of vulnerabilities from being exposed outside of a data center or network. A system may provide a mechanism for locating targeted content and notifying a firewall or other security subsystem of the data, to facilitate restricting access to the targeted content. Mechanisms described herein may be employed in a data center having a firewall that restricts access to a data center or network. A method for such purpose may include one or more actions to pre-index content, including storing keywords, expressions, or other identifying information pertaining to targeted content, using the identifying information to locate targeted content, and providing information descriptive of the discovered content.

A system may include a local indexing component that crawls content in a data center and creates an index of the content. It may further include a manager component that receives search specifications, employs the index and search specifications to identify targeted content among the data center content, and provides a mechanism to restrict publication of the targeted content. The manager component may receive search specifications for finding fingerprints of vulnerabilities and use the received specifications to identify the targeted content. Search specifications may be received from an external source, an administrator, or a local process.

In one aspect of the system, targeted content may include fingerprints of vulnerable software and/or confidential content, and search specifications received from an external source may identify the fingerprints. Search specifications may also identify the confidential content.

In one aspect of the system, the manager component may provide an application programmer interface to enable local clients to search the content or to enable local processes to retrieve information relating to vulnerabilities or sensitive content. The system may further include a firewall that selectively performs actions based on whether a notification has been received indicating that items of the content are targeted. The actions may include one or more of disallowing requested content to be sent to an external network, restricting publication of targeted content, preventing an external crawler from retrieving targeted content, or restricting access to the targeted content to a privileged group of users.

In one aspect of the system, content that is crawled and indexed may include static documents or dynamic documents provided by a web server, and/or application content received from an application server.

In another aspect of the system, receiving specifications of targeted content or searching for targeted content may be performed prior to publication of the content or after publication of the content.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
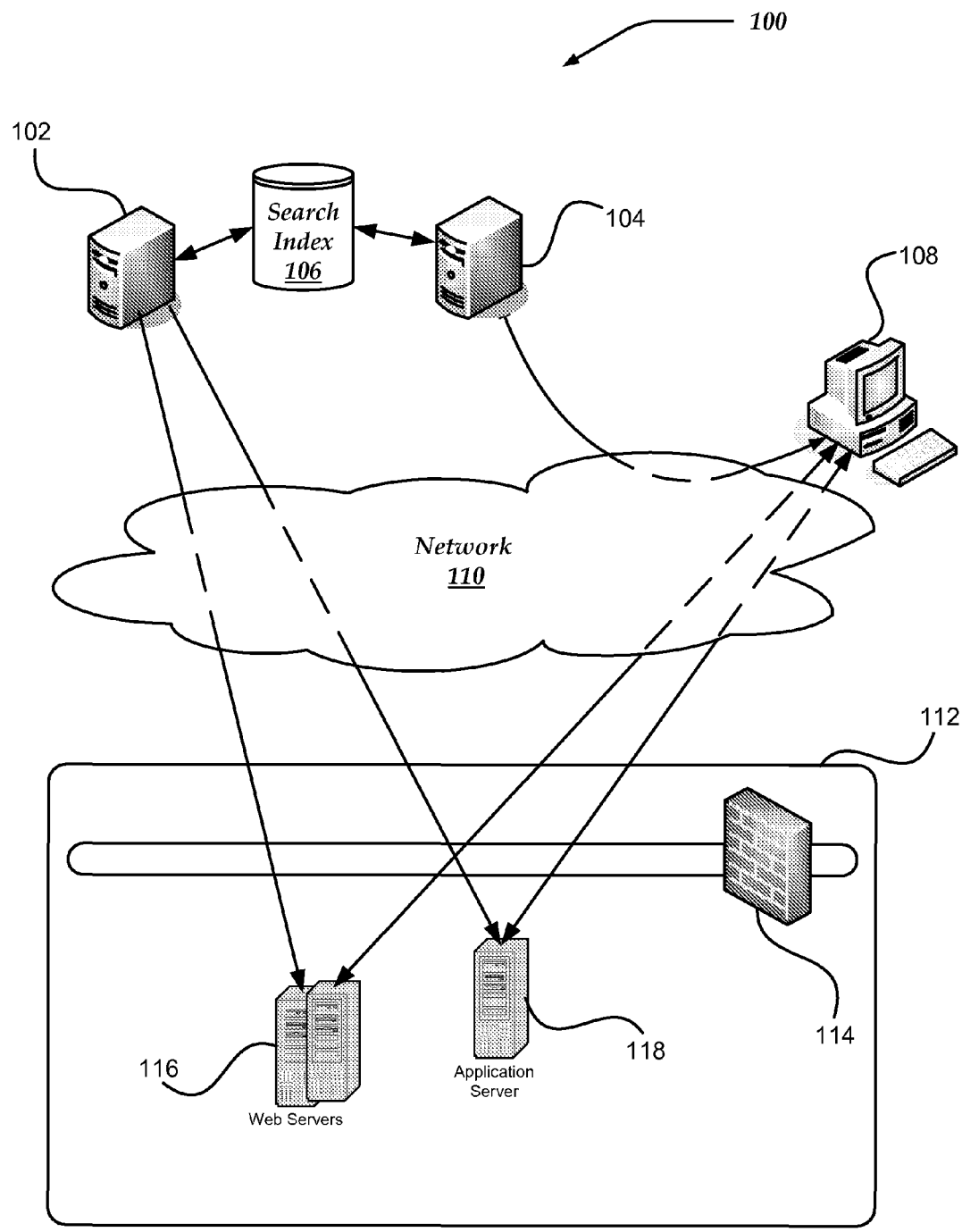
FIG. 1 shows one embodiment of an environment in which the mechanisms of the present invention may be employed.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "local" describes a relationship between two or more computing devices wherein the devices are physically located in a small geographic area, such as a home, office, or a building, and communicate with each other over a local area network or without using a network, such as by wired or wireless mechanisms. The term "remote" describes a relationship that is not local, such as communication over a wide area network, global network, or combinations thereof.

As used herein, the term "Uniform Resource Identifier" (URI) refers to a string of characters that identifies a resource. A Uniform Resource Locator (URL) is one type of URI.

As used herein, the term "vulnerable" with respect to an application program, operating system component, or other component refers to a characteristic of being susceptible to exploitation by an adverse user. A vulnerable component may be characterized as because of the existence of a security weakness. This may be a result of a bug, an out of date version, logic that is exploitable, or other expressions of insufficient security.

As used herein, the term "fingerprint" with respect to a vulnerability refers to content, or a characteristic of content, that is indicative of the existence of the vulnerability. A simple example of a fingerprint is a string or regular expression that exists in documents produced or modified by software containing the vulnerability. For example, a string "Powered by Application X rev. 2. 1" in a document indicates that a particular version of Application X created or modified the document. If a known vulnerability exists in this version, the string may be considered a fingerprint of the known vulnerability. A fingerprint is not limited to a string or regular expression. Existence of multiple specified keywords in any location in a document may be a fingerprint. Existence of multiple regular expressions within a specified proximity of each other is another example of a fingerprint. The existence of one or more expressions in a certain location of a document may be a fingerprint.

It is to be noted that the terms "fingerprint" and "indicative" do not suggest complete accuracy. A fingerprint may be overinclusive and/or underinclusive, and may result in false positives or false negatives.

As used herein, the term "sensitive" with respect to content or data refers to content or data that is confidential or has a level of privacy so as to make unrestricted public disclosure undesirable. Examples of sensitive content are social security numbers, customer lists, or documents with confidential information. Sensitive content may include content that is distributed on a limited basis, such as to subscribers, customers, or other limited audiences, and is not intended to be freely distributed without restriction.

As used herein, the term "targeted" with respect to content or data refers to content or data that is intended to be identified by the mechanisms herein described. This included content that is undesirable to be distributed to the public, at least in certain situations. This may include fingerprints of vulnerabilities or confidential content or data. It may include other types of content for which there is a desire to identify or restrict distribution, such asmalicious software, including viruses or other malware.

The components may execute from various computer readable media having various data structures thereon. The components may communicate via local or remote processes such as in accordance with a signal having one or more data packets (e.g. data from one component interacting with another component in a local system, distributed system, or across a network such as the Internet with other systems via the signal). Computer components may be stored, for example, on computer readable media including, but not limited to, an application specific integrated circuit (ASIC), compact disk (CD), digital versatile disk (DVD), read only memory (ROM), floppy disk, hard disk, electrically erasable programmable read only memory (EEPROM), flash memory, or a memory stick in accordance with embodiments of the present invention.

FIG. 1 is a block diagram of an environment 100, in which some aspects of the present invention may be employed. Environment 100 is only one example of a suitable environment and is not intended to suggest any limitation as to the scope of use or functionality of the present invention.

As shown in the figure, environment 100 includes a web crawler 102 having a search index 106 directly or indirectly connected thereto. Web crawler 102 may comprise one or more computing devices, such as servers, and associated components. The term computing device encompasses servers, personal computers, laptop computers, handheld computers, PDAs, handheld computers, cell phones, smart phones, or other computing devices having one or more processors. Search index 106 includes a data repository and may comprise one or more storage devices, one or more processors, database software, or various other hardware or software components. Each storage device may be a device having one or more types of volatile or non-volatile memory, such as RAM, cache memory, disk drives, optical disks, solid state memory, or the like.

Web crawler 102 and search index 106 may have one or more corresponding search processors 104. Search processor 104 may comprise a computing device, such as a server, and associated program instructions. The computing device may be the same type of computing device as web crawler 102, or each may be a different type of computing device. The functions of web crawler 102 and search processor 104 may be combined in a single computing device, or distributed among multiple computing devices in a variety of configurations. The combination of web crawler and search processor is sometimes referred to as a "search engine."

Data center 112 may a web site, local area network (LAN), or any set of one or more servers and related components that serve as a source of network content. Data center 112 may have an associated firewall 114, comprising hardware, software, or a combination thereof, that monitors communications entering or exiting data center 112 and performs actions to restrict activity, based on security specifications. A logical boundary around the set of components protected by the firewall may be referred to as the "perimeter" of the data center. Networks or other components outside of a perimeter are considered to be external to the data center. Components within the perimeter are considered to be local to the data center.

Data center 112 may further include web servers 116 or application server 118. Web servers 116 may provide web pages, files, images, audio, video, software, or other content to external users, as requested. Application server 118 may include one or more applications that are accessible to external users or servers. Application server 118 may enter into communications or transactions with external users or servers, and provide data as requested. As illustrated, web servers 116 or application server 118 may communicate with web crawler 102, search processor 104, or external client 108 across a network 110. Network 110 may comprise one or more interconnected networks or communication mechanisms, such as the Internet, cellular communications, or the like.

Web crawler 102, search index 106, and search processor 104 may operate together in the following manner. Web crawler 102 may be "seeded" with one or more Uniform Resource Identifiers (URIs) or other network addresses for retrieving web pages or other content. It may use these network addresses to retrieve corresponding content. The content may then be scanned for URIs or other network addresses. The new links are added to the original list of addresses, and the process repeated. Because much content available on the Internet is linked to from other content, this process eventually may retrieve a large amount of content and addresses. As illustrated in FIG. 1, web crawler may crawl and retrieve content from web servers 116 or application server 118. A web crawler may retrieve content by employing any one or more of a number of network protocols at various layers, including HTTP, FTP, SSL, TLS, WAP, or other protocols.

As each web page or other content is retrieved by the web crawler 102, the content may be scanned, indexed, and stored in search index 106. This is performed in a manner that allows subsequent retrieval of pages that contain a specified keyword, keyword combination, or by another type of search specification. A user of the search engine, such as external client 108, may send a query to search processor 104, with a search specification, such as one or more keywords. The search processor 104 may query the search index 106 for matches, or "hits" to the search specification, and provide the external client 108 with the list of matches, together with corresponding URIs or network addresses. Search processor 104 may also provide, along with the list of matches, a description, summary, or sample of the content corresponding to each item. The external client 108 may then retrieve all or a portion of the content, as desired, from the original location or from a search engine cache associated with the search engine. The cache may be stored in the search index 106 or separately. As illustrated in FIG. 1, external client 108 may retrieve content from web servers 116 or application server 118 directly, or indirectly as stored in the search engine cache associated with search processor 104.

External client 108 may be an adverse party that desires to find sensitive content or vulnerabilities. As discussed above, external client may perform searches that retrieve sensitive content from a specific data center or from multiple data centers. External client 108 may perform searches for signatures of vulnerabilities, such as searching for documents created or modified by a software component known to be exploitable vulnerabilities. When searching for vulnerabilities, external client 108 may not need to retrieve content or signatures; it may be sufficient to identify a data center or URI where such signatures are found. It is to be noted that external client 108 need not be an adverse party that intentionally retrieves targeted content. It may be a user who retrieves sensitive content without malicious intentions.

Figure 2:
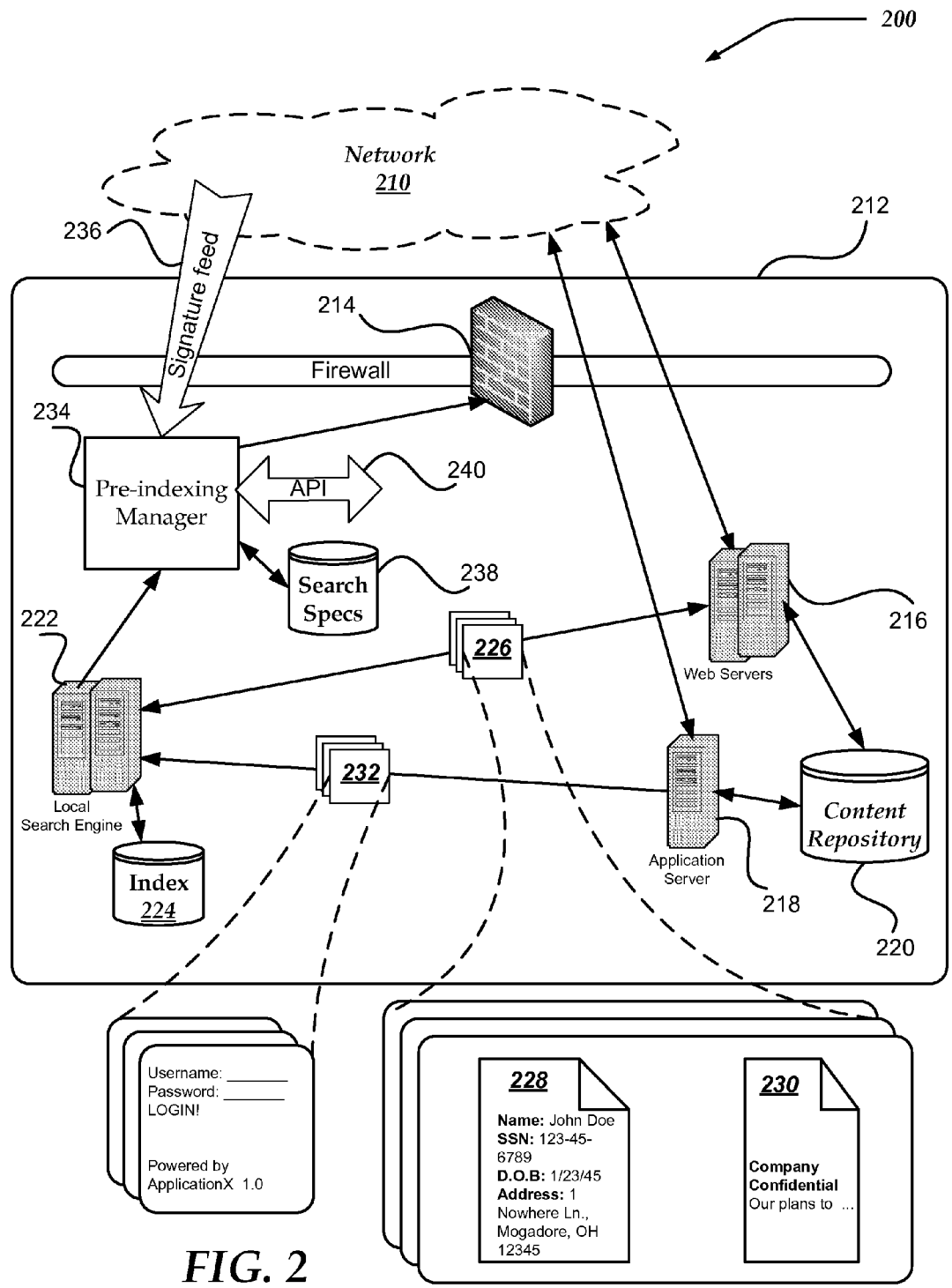
FIG. 2 shows one embodiment of a system implementing aspects of the present invention.

FIG. 2 is a block and pictorial diagram of a pre-indexing system 200, in accordance with some embodiments of the present invention. Pre-indexing system 200 is only one example of a suitable system and is not intended to suggest any limitation as to the scope of use or functionality of the present invention. Thus, a variety of system configurations may be employed without departing from the scope or spirit of the present invention. Pre-indexing system 200 may be employed in an environment such as environment 100 of FIG. 1.

As shown in the figure, pre-indexing system 200 includes a data center 212, which is indicated by a perimeter that may be applied to a data center. As used herein, the term data center may include a web site, LAN, or other localized source of network content. Data center 212 may correspond to data center 112 of FIG. 1, and the discussion of FIG. 1 may be applicable to data center 212 and pre-indexing system 200. As illustrated, data center 212 includes a firewall 214, comprising hardware, software, or a combination thereof, that monitors communications entering or exiting data center 212 and performs actions to restrict activity, based on security specifications. For example, firewall 114 may examine incoming requests and block requests based on network protocols, source or destination addresses, or conformance to various rules.

Data center 212 may further include web servers 216 or application server 218. Web servers 216 may provide web pages, files, images, audio, video, or other content to external users, as requested. Application server 218 may include one or more applications that are accessible to external users or servers. Application server 218 may enter into communications or transactions with external users or servers, and provide data as requested. FIG. 2 further illustrates content repository 220, which serves as a database and a repository for files or other content. Web servers 216 or application server 218 may store or retrieve content from content repository 220. A portion of the data may be used for processing other data. A portion of the data may be processed and provided to requesting clients. Requesting clients may be external clients, such as external client 108, web crawler 102, or search processor 104 of FIG. 1. Requesting clients may be internal computing devices, such as local search engine 222, or client devices or servers (not shown) internal to data center 212.

Web servers 216 and application server 218 may provide data that is retrieved from content repository 220, processed in some manner, and sent to a requesting client. Though not illustrated in FIG. 2, web servers 216 or application server 218 may also retrieve data from other servers. Processing data may include, for example, formatting, translating, filtering, organizing, or combining content. Processing may also include analysis of data, such as producing a count of a number of specified items in content repository 220, an average, or other statistical analysis. Content produced by web server 216 or application server 218 may therefore be static, dynamic, or a combination thereof. In one embodiment, web servers 216 or application server 218 may receive, process, and provide data that is streamed or otherwise communicated to them, such as an audio or video feed.

Web servers 216 or application server 218 may communicate with external users, servers, or other computing devices across network 210. Network 210 may be a wide area network, such as the Internet, or another type of network or communication mechanism, or a combination thereof. Network 210 is not part of system 200, but is shown in FIG. 2 to illustrate a communication mechanism with external users.

As illustrated, data center 212 includes local search engine 222. Local search engine 222 includes one or more servers. In one embodiment, local search engine 222 includes a crawler that performs functions of crawling similar to that described for web crawler 102 of FIG. 1; however, it may be restricted to crawling content within data center 212. Local search engine 222 may be seeded with one or more URIs that identify content stored in content repository 220, or provided by web servers 216 or application server 218. Local search engine 222 may be configured with logic or data to perform transactions with web servers 216 or application server 218 in order to retrieve application content. This may include, for example, a list of account numbers or other parameters to use when performing a transaction, or logic to generate parameters. A crawler component of local search engine 222 may use the URI(s) to retrieve content, such as content stored in content repository 220 or another source. Content may be retrieved from web servers 216, application server 218, or another source. The content may be indexed, and indexing data added to index 224. The content may then be scanned for additional URIs. The new URIs may be added to the original list of URIs, and the process repeated, in order to retrieve all content, or a substantial portion thereof. The content may be retrieved by using network protocols such as those used by web crawler 102 (FIG. 1), such as HTTP or FTP. Communication protocols that are primarily used for local communication, such as 802.11, Bluetooth, or other short range communication mechanisms may be used by local search engine 222 to retrieve content.

FIG. 2 illustrates some examples of content that may be retrieved by local search engine 222. Application pages 232 are an example of pages that may be retrieved from application server 218 by local search engine 222. The expanded view of application pages 232 show a composite page serving as a web service front end, that may have been created from a page template and data, all of which may be retrieved from content repository 220. The illustrated composite page includes fields for "username" and "password," either of which may be sensitive content. The illustrated composite page also includes the text "Powered by Application X 1.0," which is an explicit version string of software that created this composite page, potentially indicating to the attacker that known attacks against this version will likely work if unleashed against this web service. Any one or more of application pages 232, or a portion thereof, may be considered to be targeted content, as discussed herein.

Web pages 226 are examples of pages that may be retrieved from web servers 216. The expanded view of web pages 226 illustrates two types of pages or documents. Dynamic document 228 is a document that may be dynamically created by combining one or more templates with data extracted for each field. The example page of dynamic document 228 includes a name, social security number, date of birth, and address. The values of one or more of these fields may be considered to be sensitive content as discussed herein. Static document 230 may be a document such as a word processing document, spreadsheet, presentation, or the like, that is stored in content repository 220 in its entirety, or substantially in its entirety. As discussed herein, any such document may be considered to be sensitive content or a fingerprint of a vulnerability. As used herein, the term "content" may include metadata corresponding to other content, such as title, author, timestamps, file properties, or the like. An item of content may be determined to be targeted based on its metadata.

Local search engine 222 may index content that it retrieves and store the indexed data in index 224. In one implementation, at least some of the content may be cached in index 224. Index 224 may include a data repository and may comprise one or more storage devices, one or more processors, database software, or various other hardware or software components. Each storage device may be a device having one or more types of volatile or non-volatile memory, such as RAM, cache memory, disk drives, optical disks, solid state memory, or the like.

Index 224 may include a variety of types of data that may be used to associate content with identification of the content. This may include, for example, data associating strings with documents that include the strings. It may include data associating characteristics of documents with the corresponding documents. For example, an index may include data that facilitates identifying documents by a specified author, having a specified size or date, or other such characteristics.

Local search engine 222 may further include a search processor that retrieves data from index 224. Local search engine 222 may receive one or more search specifications, process the specifications, and retrieve a list of one or more matches to the search specifications, or no match. In one embodiment, each search specification is designed to retrieve content that may be targeted content because it is sensitive content or it includes a fingerprint of a vulnerability. The list of one or more matches that results from each search specification may be considered as targeted content. In one embodiment, the lists of results that result from searching with each of the search specifications are aggregated. In one embodiment, duplicate results may be removed from an aggregated list. In one embodiment, multiple search specifications may be combined and processed prior to performing a search, in order to produce a list without duplications.

In one embodiment, a process of retrieving search results may filter partial results based on a relevancy score. For example, results having a relevancy score below a specified threshold may be eliminated from a result set. A search specification may include a threshold relevancy value. In one embodiment, a relevancy score corresponding to each search result may be used in subsequent processing to determine an action to perform.

In various implementations, a search specification may include a string of one or more characters, regular expressions, special characters, or a combination thereof. A search specification may include query operators or syntax from a query language.

It is to be noted that some fingerprints of vulnerabilities may be used as search specifications. However, some fingerprints of vulnerabilities may have corresponding search specifications that enable finding the fingerprints, but the search specifications may differ from the corresponding fingerprints. This may occur due to differing syntax used to specify fingerprints and search specifications. It may also occur in a situation where an administrator may improve the accuracy or efficiency of a search by creating a more optimal search specification. An administrator may, for example, specify an incremental search be performed by using a search specification that only searches documents added to the system since a previous search.

FIG. 2 further illustrates pre-indexing manager 234. Pre-indexing manager 234 may comprise computer hardware, software, or a combination thereof. In one embodiment, pre-indexing manager 234 comprises a server and program instructions for performing actions described herein, as well as additional processes. In one embodiment, pre-indexing manager 234 comprises a software component that executes on a server that also hosts local search engine 222 or firewall 214. Components of pre-indexing manager 234 may be distributed among multiple computing devices, such as local search engine 222, firewall 214, or other servers. Pre-indexing manager 234 may perform one or more of several processes, including receiving search specifications, storing the search specifications, processing search specifications, and performing searches based on the specifications. Pre-indexing manager 234 may control actions of local search engine 222, such as initiating or stopping an indexing process.

Pre-indexing manager 234 may receive search specifications from one or more sources. In one embodiment, an external entity may provide search specifications. These may be, for example, signatures of publicly known vulnerabilities or search specifications intended to retrieve such signatures. The specifications may be in the form of signatures that identify viruses or other malware. In one implementation, search specifications may be received from an automated process that discovers vulnerabilities and produces signatures or other search criteria to identify indications of the vulnerabilities. Such vulnerabilities are sometimes referred to as "zero-day" vulnerabilities. In one implementation, an administrator or other source may provide one or more search specifications. These specifications may be in the form of keywords, regular expression patterns, database queries, or other identifying criteria that may indicate sensitive data or fingerprints of vulnerabilities. Signatures or other search specifications may be received from an external source, as illustrated by signature feed 236. Search specifications may also be received from a local source, such as a server (not shown) that discovers vulnerabilities or receives signatures from an external source.

The pre-indexing manager 234 may receive one or more of these types of search specifications and store them in a search specification repository 238 for later retrieval. This may occur prior to, subsequent to, or concurrent with the crawling actions of the local search engine 222 as described herein.

The pre-indexing manager 234 may use the received search specifications to perform searches of local content. It may send the search specifications to the local search engine 222 with a request to perform one or more searches of the content, using index 224 as discussed herein.

The pre-indexing manager 234 may receive, from the local search engine 222 a set of matches corresponding to local content. The set of matches represents targeted content, or at least an indication of possible targeted content, that has been found. The pre-indexing manager 234 may notify one or more components of the targeted content. In one implementation, the firewall 214 or a management server (not shown) may be notified. In one configuration, a notification may be sent to a content owner associated with the targeted content. Notification may include a list identifying the targeted content. Notification may include identification of the content, the search specifications that retrieved the content, the location of the content, or other attributes of the content or search specifications. Notification may also include an indication of whether the targeted content is identified as sensitive content or as a fingerprint of a vulnerability.

The firewall 214 or management server may, in response to receiving a notification, perform one or more actions. One such action may be to disallow publication of the targeted content, or otherwise restrict the content from being accessed by a client or server outside of the firewall. Restricted content may be allowed to be accessed by an entity having proper authentication and authorization.

In one implementation, pre-indexing manager 234 has a corresponding API 240 that may be used by other components (not shown) to control aspects of pre-indexing manager 234, provide search specifications, or retrieve search results. In one configuration, a local server, client, or application (not shown) may use API 240 to perform searches for local users. For example, a SharePoint® server, by Microsoft Corporation, may employ API 240 to perform enterprise searches. In one configuration, a local application or service, such as a data mining application, may employ API 240 to search and retrieve content. Though FIG. 2 illustrates API 240 associated with pre-indexing manager 234, in one configuration, API 240 may be directly associated with local search engine 222.

In one embodiment, each of web servers 216, application server 218, local search engine 222, pre-indexing manager 234, and associated storage repositories are located on a common local area network (LAN). They may communicate with each other directly or indirectly using wired communication mechanisms, wireless communication mechanisms, or a combination thereof.

In one embodiment, each of web servers 216, application server 218, local search engine 222, and pre-indexing manager 234 may be implemented with one or more computing devices. In brief, one embodiment of a computing device that may be employed includes one or more central processing units (CPU), a video display adapter, and a mass memory, all in communication with each other via a bus. The mass memory may include a random access memory (RAM), a read only memory (ROM), one or more permanent mass storage devices, removable media, or a combination thereof. Mass storage devices may include a hard disk drive, optical drive, flash memory, or a floppy disk drive. The mass memory may include a general-purpose operating system, application programs, security programs, communication programs, or other computer programs.

In one embodiment, each of content repository 220, index 224, or search specification repository 238 may be implemented with one or more of a variety of types of computer storage media, including volatile or non-volatile memory, RAM, ROM, solid-state memory, disk drives, optical storage, or any other medium that can be used to store digital information.

One embodiment of a computing device may include a network interface unit, drivers, or other software for communicating with other computing devices. The computing device may employ one or more of various wired or wireless communication protocols, such as IP, TCP/IP, UDP, HTTP, SSL, WAP, Bluetooth, or the like. Communications may use direct connections, local area networks, wide area networks such as the Internet, wireless networks, or a combination thereof.

In the pre-indexing system 200, communication between any of the illustrated components may use any one or combination of wired or wireless technologies, some of which are described herein. Any of a variety of query and communication protocols may be employed to communicate with, and exchange data among the computing devices of pre-indexing system 200. In addition to the exemplary pre-indexing system 200, the invention may be practiced in a number of variations of system configurations.

Figure 3:
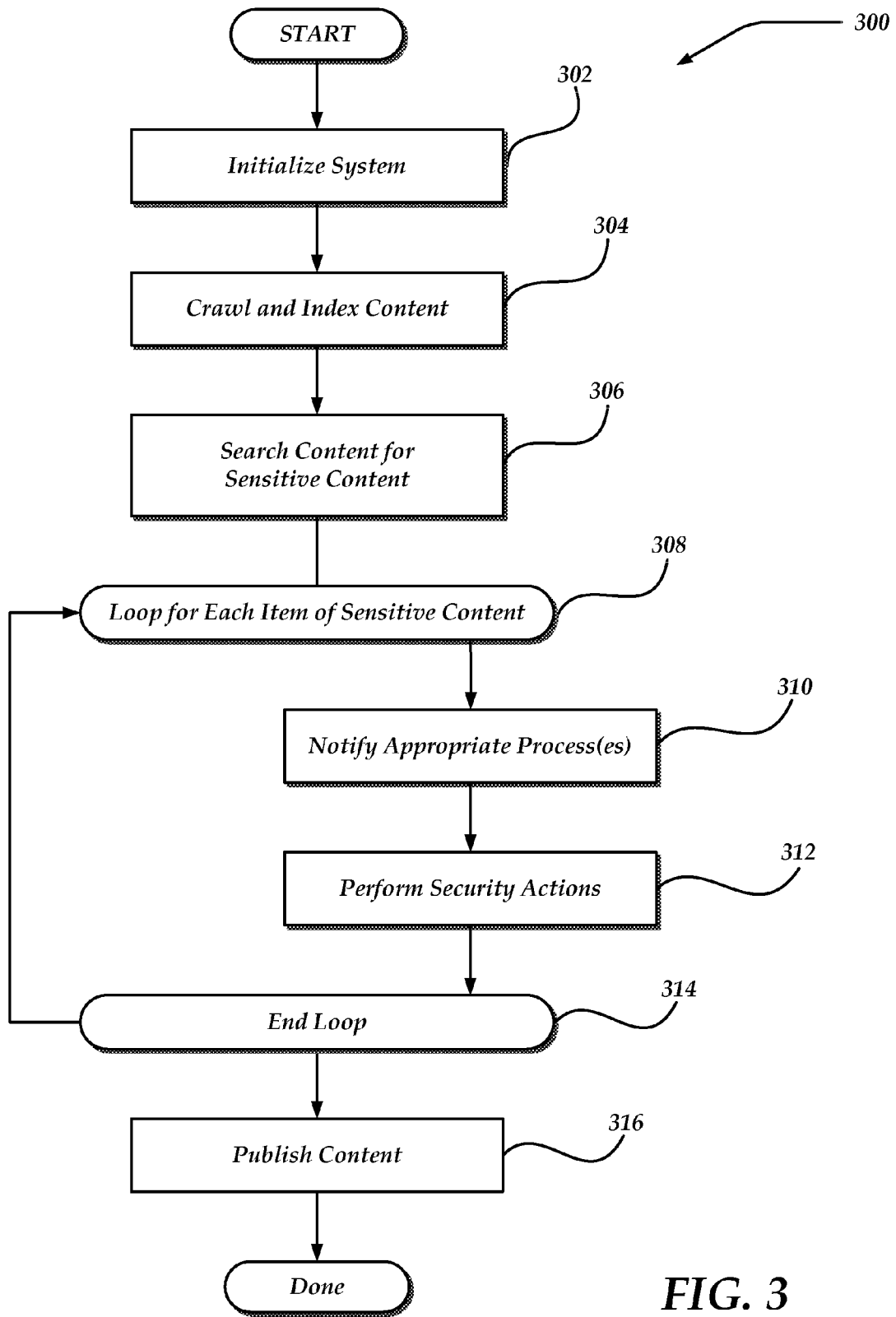
FIG. 3 is a logical flow diagram generally showing a process for limiting the exposure of sensitive content, in accordance with an embodiment of the present invention.

FIG. 3 is a flow diagram illustrating a process 300 for limiting the exposure of targeted content. Process 300 may employ system 200 of FIG. 2, or a portion thereof. It may employ any of the system variations discussed herein, or it may be performed with other systems.

As illustrated in FIG. 3, process 300 may begin, after a start block, at block 302, where initialization of the system is performed. Briefly, initialization may include receiving specifications of targeted content or search specifications from one or more sources and providing seeds to the local search engine. Initialization actions of block 302 in one embodiment are illustrated and discussed in more detail in FIG. 4 and associated text herein.

Processing may flow to block 304, where a search engine, such as local search engine 222, crawls, retrieves, and indexes content of the data center 212. This may include using URIs or other seed data to retrieve content, indexing each item of content, scanning the retrieved content for additional URIs, and using the additional URIs to retrieve additional content, as discussed herein. Retrieving content of the data center 212 may include employing logic to generate URIs or transaction sequences. For example, a set of account identifiers or other parameters may be combined with a URI or portion thereof, to form new URIs to retrieve content from web servers 216. A known transaction sequence for interacting with application server 218 may be used and optionally combined with account identifiers or other parameters to request content from the application server 218. Index data may be stored in a search index, such as index 224.

In some implementations, logic or parameters employed by local search engine 222 may be different than that used by external crawlers, such as web crawler 102. Search engine 222 may be configured to crawl, retrieve, or index content using logic to facilitate identification of targeted content. For example, this may include indexing tags, metadata, scripts, punctuation, field delimiters, lengths of fields, or other characteristics of content that may not be indexed by a web crawler. The additional indexed data may enhance searching and identification of targeted content.

Processing may flow to block 306, where the local search engine is used to search for targeted content. This action may be performed by pre-indexing manager 234. As described herein, searching for targeted content may include retrieving signatures or other search specifications from a search specification database, sending one or more search requests with the search specifications to the local search engine, and retrieving a list of matching results. Search specifications may be processed by pre-indexing manager 234 in a variety of ways. For example, multiple signatures or keywords may be combined into a single search, or multiple searches may be made with each signature or keyword, and the results aggregated. Combinations of these or other search techniques may be used. In some implementations, signatures, keywords, or other search specifications may have corresponding weighting factors that are used to retrieve results based on relevancy. The action of block 306 may further include filtering the results based on a threshold relevancy score or other parameters.

In some implementations, searches performed at block 306 may differ from those that may be performed by an external client, such as external client 108, or by an external search processor, such as search processor 104 of FIG. 1. This may be because pre-indexing manager 234 or another component of pre-indexing system 200 are configured with data that is unknown to external clients or is designed for specificities of data center 212. Search specifications or search logic may also differ due to enhanced indexing of local search engine 222, as discussed herein. This may allow, for example, searching of tags or metadata, or other characteristics of targeted data.

Process 300 may flow to block 308, where a loop begins, referred to herein as loop 308. Loop 308 iterates over each item of targeted content that has been identified, as described herein. The item being iterated over is referred to as the current item. In the flow illustrated in FIG. 3, action blocks 310 and 312 are performed within loop 308.

Process 300 may flow to block 310, where one or more processes or components are notified of the current item of targeted content. The particular component to be notified may be specified in a configuration of the system. In some implementations, the component to be notified may be based on the current item, such as its type, location, owner, or other characteristic. The component to be notified may be based on the search specifications that resulted in the current item's identification. For example, a search specification associated with malware may result in a designated component to be identified, while a search specification associated with account information may result in a different designated component to be identified.

In one configuration, a firewall, such as firewall 214 receives a notification of targeted content, or a portion thereof. In one configuration, a management server receives a notification of targeted content or a portion thereof. Notification of a component may include identification of the targeted content, a corresponding search specification, keywords or other content, location of the targeted content, a vulnerability associated with the targeted content, or other information pertaining to the discovery of the current item.

Process 300 may flow to block 312, where one or more security actions may be performed in response to identification or notification of the current item of targeted content. There are a number of security actions that may be performed by the firewall, management server, or other component. Some examples follow. Publication of the document or content containing the targeted content may be disallowed. Actions may be taken to prevent an external search engine from retrieving or indexing the targeted content. Actions may be taken to restrict access to the targeted content to members of a privileged security group, with membership in the security group authenticated by various mechanisms such as a trusted security transport. Other actions may include modifying or moving the current item.

Content that is not in itself identified as targeted, but is associated with targeted content, may be restricted from publication or external indexing. Association with targeted content may be based on timestamps, content sources, links, or other relationships. The owner of the targeted content may be notified that one or more security actions have been performed.

Processing may flow to block 314, which terminates loop 308. If there are additional items of targeted content to iterate over, processing may flow back to the beginning of loop 308, to continue processing the next item. If there are not additional items to iterate over, the processing may exit loop 308 and flow to block 316, where the content of the data center, except for any targeted content that has been restricted, is published. Publication of the content may include configuring the system to allow external clients, including external search engines, to access the content. Process 300 may flow to a done block, and return to a calling program.

It is to be noted that, although the actions of blocks 310-312 are shown within a loop, various implementations may perform any one or more of these actions outside of the loop, employ multiple loops, or perform the actions using techniques other than loops. For example, the process 300 may notify the firewall or other component of all targeted content in bulk, such that a loop is not used for each item. In one implementation, a firewall or other component may receive notifications of multiple or even all items of targeted content prior to performing security actions. In one implementation, multiple threads may be used to perform actions corresponding to one or more items of targeted content. Some of the actions of loop 308 may be performed concurrently, and the order of operation may vary.

In one embodiment, actions of blocks 302-314, or variations as described herein, may be preemptive, in that it is performed with respect to a corpus of content prior to publication of the content. Actions of blocks 302-314 may also be considered preemptive with respect to identifying signatures of vulnerabilities even if performed subsequent to publication of content containing the signatures, in that identification may be performed prior to an adverse party identifying the vulnerabilities. In one embodiment, the content may be published prior to performing some, or even all of the actions of blocks 302-314. This may occur, for example, in a system where new signatures or other search specifications may be received subsequent to publishing a corpus of content. The process of process 300, or a portion thereof, may be performed post-publication. Security actions of block 312 may include actions to remove or otherwise restrict content, even though it may have been published. In some implementations, actions of process 300, or a portion thereof, may be repeated one or more times, such that indexing of new content is a recurring process, receipt of search specifications is a recurring process, search for targeted content, and security actions may be recurring processes, and each of the recurring processes may be performed prior to, subsequent to, or concurrently with, any one or more other recurring processes. Some of the content may therefore be processed prior to publication, subsequent to publication, or both.

Figure 4:
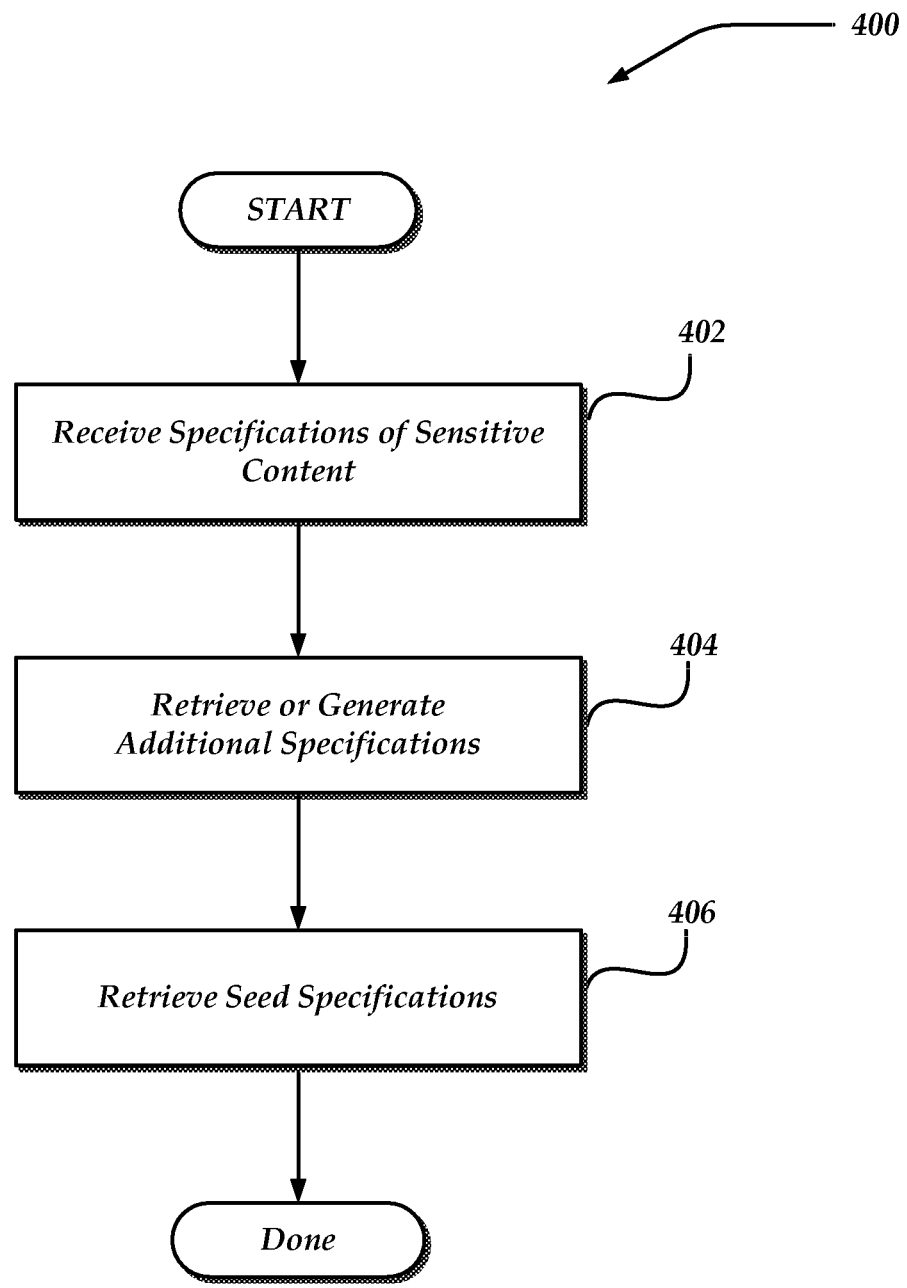
FIG. 4 is a logical flow diagram generally showing a process for initializing a system for limiting the exposure of sensitive content, in accordance with an embodiment of the present invention.

FIG. 4 is a flow diagram generally showing a process 400 for initializing a system for limiting the exposure of targeted content. Process 400 may be employed with system 200 of FIG. 2, or any of its variations as discussed herein, or another system. Process 400, or a portion thereof, may be included in the actions of block 302 of FIG. 3.

Process 400 begins, after a start block, at block 402, where specifications of targeted content may be received. This action may be performed, at least in part, by pre-indexing manager 234 of FIG. 2, or by another component of system 200. As discussed herein, pre-indexing manager 234 may receive specifications from one or more sources, including an administrator, signature feeds or other external sources, a local source that discovers vulnerabilities, or another source. Specifications may be processed, aggregated, and stored locally, such as in search specification repository 238.

Process 400 may flow to block 404, where the specifications received at block 402 may be used to retrieve or generate additional specifications of targeted content. This may occur, for example, in a configuration where the specifications of block 402 reference locations, sources, or types of targeted content, and these specifications can be employed to retrieve search specifications. Actions of block 402 may include using program logic to generate specifications from other specifications, such as combining parameters with URIs or transaction instructions.

Process 400 may flow to block 406, where seed specifications are retrieved. As discussed herein, seed specifications may include one or more URIs or other identification of content pertaining to the corpus of content in data center 212. The local search engine 222 may use the seed specifications, or simply "seeds," to retrieve an initial set of documents or pages, which are then used to find other source specifications. Seed specifications may be received by the pre-indexing manager 234 from another component employing API 240, from another local component, from an administrator, or another source. In one embodiment, local search engine 222 receives the seed specifications.

Process 400 may flow to a done block, where it returns to a calling program, such as process 300 of FIG. 3.

It will be understood that each block of the flowchart illustrations of FIGS. 3-4, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for restricting distribution of an item of content at a data center, the item indicative of a software vulnerability associated with a version of a software component, the system comprising:
   a) a local indexing component configured to perform actions including creating a search index of the content at the data center by retrieving and employing an identification of content as a seed to retrieve a set of documents, the content including the item of content and other content;
   b) a manager component configured to perform actions including:
      i) identifying a document corresponding to the version of the software component; and
      ii) enabling a mechanism that performs a security action on the identified document;
      wherein identifying the document comprises:
         i) receiving one or more search specifications corresponding to the version of the software component; and
         ii) employing the search index and the one or more search specifications to identify the document corresponding to the version of the software component, wherein the document that is identified by the one or more search specifications is created or modified by the version of the software component associated with the vulnerability; and
   c) one or more processors that execute computer instructions to implement the manager component.

2. The system of claim 1, the one or more search specifications including a fingerprint of the vulnerability and wherein employing the search index and the one or more search specifications to identify the document includes performing a search to identify the document the fingerprint including one or more strings that indicate the version of the software component that created or modified the document.

3. The system of claim 1, wherein the one or more search specifications comprises a specification of a location in a document where an expression may exist, the specification of the location and the expression being indicative of the version of the software component that created or modified the document.

4. The system of claim 1, wherein receiving the one or more search specifications comprises receiving at least one search specification of a fingerprint of a vulnerability from an external source.

5. The system of claim 1, the security action comprising preventing an external crawler from retrieving the item of content corresponding to the version of the software component.

6. The system of claim 1, wherein the one or more search specifications comprises at least one fingerprint associated with the document indicative of a software version in use at the data center.

7. A computer-implemented method for restricting targeted content at a data center, comprising:
   a) creating a search index of content at the data center by retrieving and employing a seed specification to retrieve an initial set of documents or pages which are used to find other specifications;
   b) retrieving a plurality of specifications of the targeted content, each specification corresponding to at least one software component vulnerability, wherein the targeted content is created or modified by a version of a software component associated with the software component vulnerability and is indicative of the version of the software component;
   c) identifying the targeted content by employing the plurality of specifications to search the search index for the targeted content; and
   d) selectively preventing an external crawler from retrieving at least a portion of the identified targeted content based on a result of the search of the search index.

8. The method of claim 7, wherein creating the search index of content at the data center comprises:
   a) retrieving application content from an application server;
   b) performing actions to create dynamic documents at a web server and retrieve the dynamic documents from the web server; and
   c) including data representative of the application content and the dynamic documents in the index.

9. The method of claim 7, further comprising publishing the content at the data center to at least one external client prior to retrieving the plurality of specifications and searching the index of content for the targeted content.

10. The method of claim 7, wherein each of the specifications of the targeted content comprises a string or a regular expression, searching the search index comprising retrieving a list of matching results based on each string or regular expression.

11. The method of claim 7, further comprising dynamically creating a document by combining a template having one or more fields with data extracted for each field of the template, wherein creating a search index of content at the data center comprises including the extracted data in the search index, and wherein identifying the targeted content includes identifying the document as targeted content based on the one or more fields.

12. The method of claim 7, further comprising selectively enabling an external crawler to retrieve a dynamic document of the content based on a software version that created or modified the dynamic document.

13. A system for distributing content of a data center, comprising:
   a) an indexing component configured to perform actions including retrieving and employing an identification of content as a seed to retrieve at least portions of the content at the data center and create a search index of the content at the data center;
   b) a search component comprising computer program instructions executable by a processor and configured to perform actions including identifying targeted content corresponding to a version of a software component having a vulnerability by receiving one or more search specifications corresponding to the version of the software component and performing searches, the searches employing the search index of the content, wherein the targeted content was created or modified by the version of the software component;
   c) a publishing component configured to perform actions including publishing a proper subset of the content at the data center, publishing the proper subset of the content comprising, in response to identifying the targeted content, preventing an external crawler from retrieving the targeted content; and
   d) one or more processors that execute computer instructions to implement the search component.

14. The system of claim 13, further comprising an API that enables a local client to search the search index of content for a content item.

15. The system of claim 13, the search component comprising a search specification repository configured to perform actions including storing search specifications corresponding to at least one fingerprint of at least one software vulnerability and search specifications corresponding to confidential content.

16. The system of claim 13, the publishing component configured to perform actions including restricting external distribution of content that has previously been published based on the identification of the targeted content.

17. The system of claim 13, the search component configured to perform actions including receiving fingerprints of publicly known software vulnerabilities, receiving fingerprints of zero-day vulnerabilities, and receiving specifications of confidential content.

18. The system of claim 13, the search component configured to perform actions including searching for documents based on a specification of software that produced or modified the documents.

19. The system of claim 13, further comprising an interface that enables a local client to retrieve the targeted content.

* * * * *